(12) United States Patent
Biasotti

(10) Patent No.: US 11,412,587 B2
(45) Date of Patent: Aug. 9, 2022

(54) ANIMATED FIREFLY NOVELTY DEVICE

(71) Applicant: Mark Biasotti, San Jose, CA (US)

(72) Inventor: Mark Biasotti, San Jose, CA (US)

(*) Notice: Subject to any disclaimer, the term of this patent is extended or adjusted under 35 U.S.C. 154(b) by 222 days.

(21) Appl. No.: 16/538,782

(22) Filed: Aug. 12, 2019

(65) Prior Publication Data
US 2021/0051776 A1 Feb. 18, 2021
US 2022/0007474 A9 Jan. 6, 2022

Related U.S. Application Data

(60) Provisional application No. 62/748,414, filed on Oct. 20, 2018.

(51) Int. Cl.
| | |
|---|---|
| *H05B 33/08* | (2020.01) |
| *F21V 31/00* | (2006.01) |
| *F21V 21/08* | (2006.01) |
| *F21V 23/04* | (2006.01) |
| *F21S 9/03* | (2006.01) |
| *G05B 19/042* | (2006.01) |
| *H05B 45/00* | (2022.01) |
| *H02J 7/35* | (2006.01) |

(52) U.S. Cl.
CPC ............ *H05B 45/00* (2020.01); *F21S 9/03* (2013.01); *F21V 21/0824* (2013.01); *F21V 23/04* (2013.01); *F21V 31/005* (2013.01); *G05B 19/042* (2013.01); *G05B 2219/25257* (2013.01); *H02J 7/35* (2013.01)

(58) Field of Classification Search
None
See application file for complete search history.

(56) References Cited

U.S. PATENT DOCUMENTS

| | | | |
|---|---|---|---|
| 3,477,157 A | 11/1969 | Paquette | |
| 3,494,058 A | 2/1970 | Paquette | |
| 3,736,683 A | 6/1973 | Paquette | |
| 4,570,924 A | 2/1986 | Connelly | |
| 6,851,208 B2 * | 2/2005 | Carter | G09F 19/12 362/286 |
| 7,212,932 B1 | 5/2007 | Taylor | |
| 8,206,007 B2 | 6/2012 | Lynn | |
| 8,594,959 B2 | 11/2013 | Schaal et al. | |

(Continued)

OTHER PUBLICATIONS

Seliger et al, The Colors of Firefly Bioluminescence: Enzyme Configuration and Species Specificity, Proceedings of the National Academy of Sciences, Jul. 1, 1964, pp. 75-81, vol. 52 (1) (retrieved on Jun. 19, 2019 from https://www.pnas.org/content/pnas/52/1/75.full.pdf).

(Continued)

*Primary Examiner* — Jared Fureman
*Assistant Examiner* — Aqeel H Bukhari

(57) ABSTRACT

An indoor-outdoor novelty device which simulates the flight and illumination patterns of real fireflies in dark conditions. The device provides the illusion of a flying illuminated firefly, appearing and disappearing at pseudorandom positions. This behavior provides a realistic firefly effect especially when multiple devices are present. This effect is due to the unique configuration of this device under microcontroller control. The device may be configured as completely self-contained, self-operating and self-charging; not requiring user intervention for daily operation and can be located indoors or outdoors.

11 Claims, 9 Drawing Sheets

(56) References Cited

U.S. PATENT DOCUMENTS

| | | | |
|---|---|---|---|
| 8,928,227 B2 | 1/2015 | Padula et al. | |
| 2010/0112898 A1* | 5/2010 | Reyes | A63H 29/22 |
| | | | 446/484 |
| 2010/0132139 A1* | 6/2010 | Jungnickel | A61C 17/3418 |
| | | | 15/22.1 |
| 2011/0285128 A1* | 11/2011 | Hobdy | H02K 35/02 |
| | | | 290/42 |
| 2015/0036325 A1* | 2/2015 | Cohen | F21S 10/066 |
| | | | 362/124 |
| 2017/0358962 A1* | 12/2017 | Morton | H02K 1/2733 |
| 2018/0202620 A1* | 7/2018 | Soofer | F21S 9/035 |
| 2020/0367441 A1* | 11/2020 | Guzman | B64C 39/024 |

OTHER PUBLICATIONS

Firefly Magic Solar and Battery-Operated Firefly Lights (retrieved on Jun. 19, 2019 from https://fireflymagic.com ).

Firefly (retrieved on Jun. 19, 2019 from https://en.wikipedia.org/wiki/Firefly).

\* cited by examiner

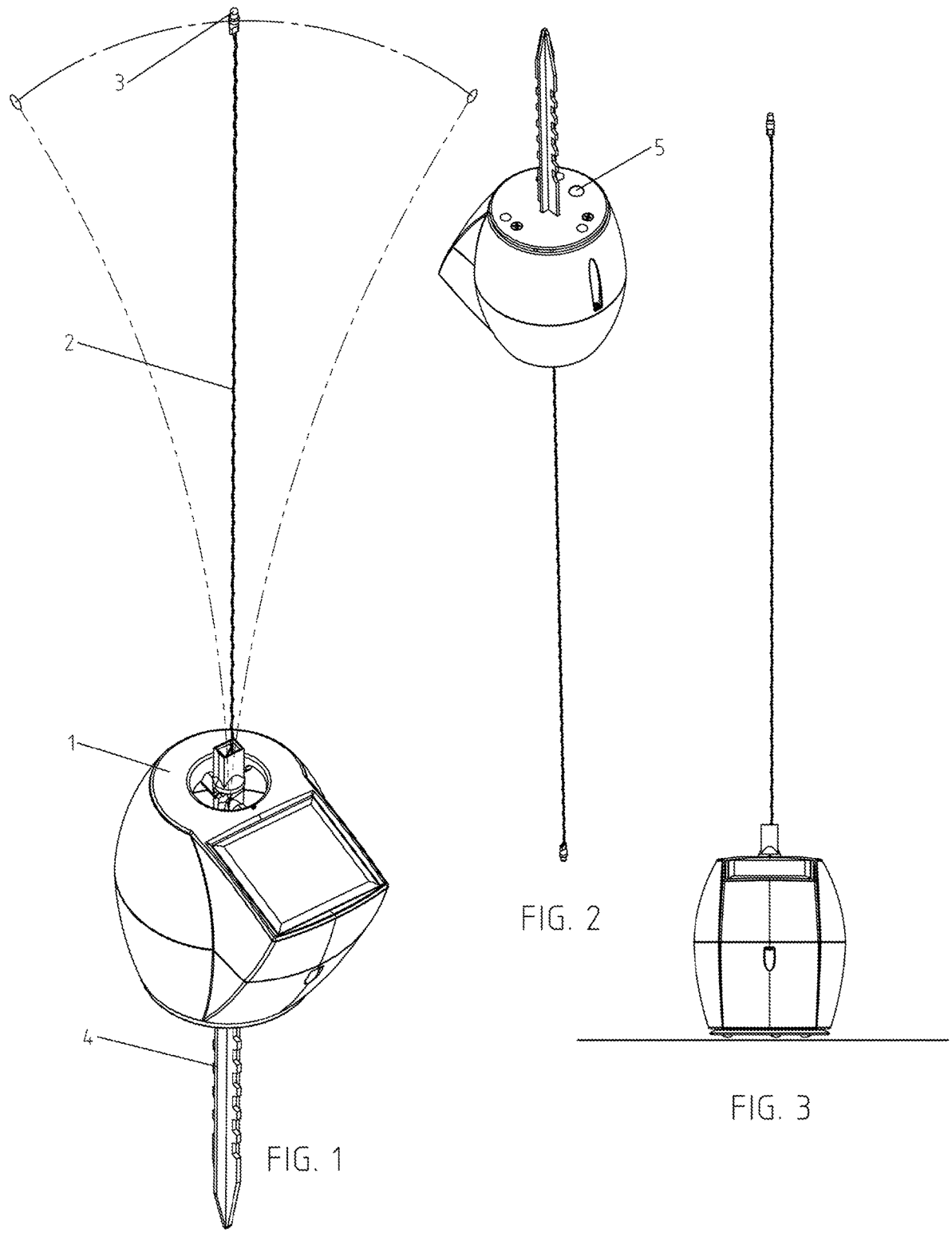

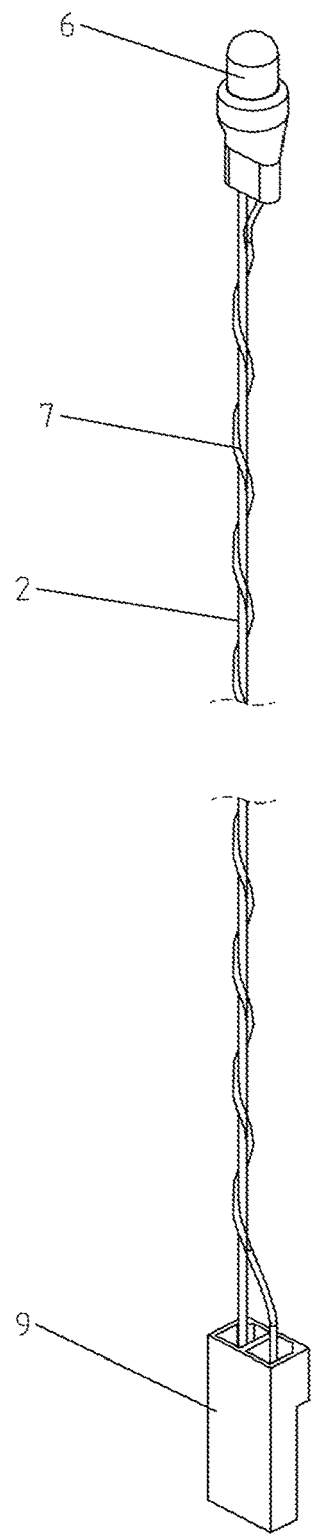
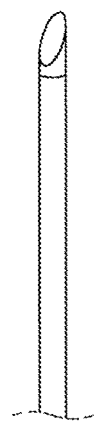
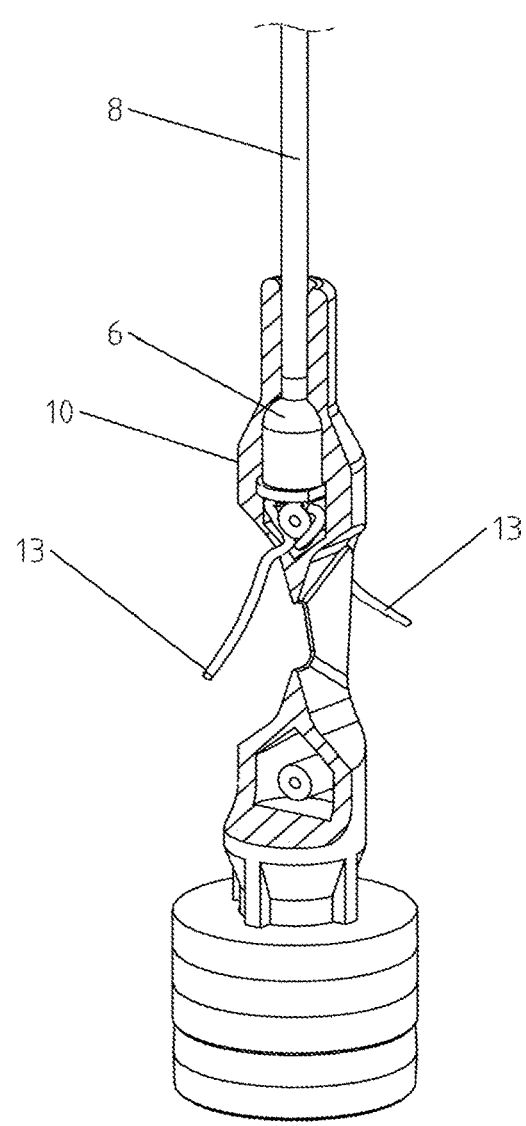
FIG. 4   FIG. 5

ANIMATED FIREFLY NOVELTY DEVICE

CROSS-REFERENCE TO RELATED APPLICATIONS

This application claims the benefit of provisional patent application No. 62/748,414 filed Oct. 20, 2018 and is incorporated by reference in its entirety herein.

BACKGROUND OF THE INVENTION

There are a few thousand species of Lampyridae (fireflies) in the world. They vary in their flashing pattern and color. The color varies, most peaking between 530 nanometers to 620 nanometers (green to yellow-orange) with group patterns appearing random or in sequence with each other. The period of illumination is very brief; on the order of 50 to 1000 milliseconds. In order to mimic a Lampryridae, you need to simulate the correct amount of illumination, period of illumination, color and position (movement).

U.S. Pat. Nos. 3,736,683; 3,494,058; and U.S. Pat. No. 3,477,157 to Paquette is an advertising display comprised of a flashing light attached to an elongated, flexible, elastic member or wand.

U.S. Pat. No. 4,570,924 to Connelly is an illusion device that places on an illusionist's finger or thumb a circuit board attached to a stiff but resilient wire with a flashing light source. The performer movement produces motion.

U.S. Pat. No. 6,851,208 to Carter incorporates a motor driven fan mounted to swing freely at the distal end of the first depending flexible line segment. The fan induces thrust in the direction normal to the line segment. A LED is attached to the second distal end of the line segment. The result is that the thrust of the fan provides motion and the rotation of the LED will cause the light to appear to flash on and off as the LED body eclipses the light transmitting opening.

U.S. Pat. No. 7,212,932 to Taylor is an electronic circuit and program to control LED devices to mimic Lampyridae illumination.

U.S. Pat. No. 8,206,007 to Lynn incorporates a flexible wand that is attached to an eccentrically weighted motor that causes vibration. At one end of an extension to the wand or alternatively the motor housing, hangs with a cable with a cluster of multi-color LEDs.

U.S. Pat. No. 8,594,959 to Schaal is an electronic circuit and program to control a LED that is encapsulated in a small plastic housing.

U.S. Pat. No. 8,928,227 to Padula is an electronic circuit powered by a solar cell and battery to power a LED.

The prior art does not simulate both the flight and illumination patterns of real fireflies in a device that can be self-contained, self-powered, and self-operated. Prior art methods require correct placement of the device and limits the placement of the observer as to not destroy the affect. Fans need to be hidden from view and can generate noise. The placement of some devices is limited by requiring overhead or elevated objects to mount to.

SUMMARY OF THE INVENTION

The present invention generally discloses a device which simulates a flying bioluminescence organism using a rod with an illuminated tip extending from an enclosure that contains a motor for producing rod motion and a microcontroller for controlling motion and illumination.

Advantages

The present disclosure can provide a number of advantages depending on the particular aspect, embodiment, and/or configuration. Several advantages of the present disclosure are: the device mimics real fireflies thru the pseudorandom period of illumination, non-illumination, motion, position and velocity. The device can be placed indoors or outdoors. The thin rod is not perceivable in low light thereby resulting in a point of light that appears to float in mid-air. The illuminated tip motion can be pseudo-randomly positioned with pseudorandom velocity within a 360 degree upper hemispherical area. The enclosure can be made water-resistant and be placed anywhere indoors or outdoors on horizontal surface as well as staked. By virtue of having its own power-source and programmable operation it has the ability to operate for years without human intervention. The user can adjust the period of illumination and motion with a programmable button. Several devices can be placed in proximity to each other and optionally programmed so that no two devices will have the same behavior.

BRIEF DESCRIPTION OF THE DRAWINGS

FIG. 1 illustrates a perspective left side view of the firefly device from above.

FIG. 2 illustrates a bottom perspective right side view showing underside of firefly device.

FIG. 3 illustrates the device with ground stake removed and sitting on a horizontal surface.

FIG. 4 illustrates a close-up perspective view of the plug-in rod assembly.

FIG. 5 illustrates a clear rod with integrated light source in the pendulum.

REFERENCE NUMERICS

Figure 6:
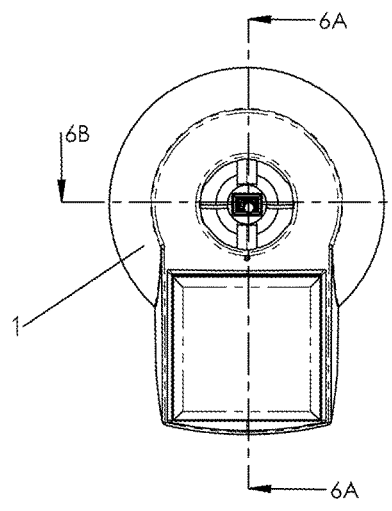
FIG. 6 and FIG. 6A illustrates a cross-sectional view section thru the mid-right side showing internal components of device.

1. Enclosure
2. Wire rod
3. Illuminated tip
4. Ground stake

5. MODE button
6. LED1
7. Ground wire
8. Clear Rod
9. Connector
10. Pendulum
11. Pendulum opening
12. Stationary pin
13. Flexible wire
14. Magnet
15. O-ring
16. Electromagnetic coil
17. Microcontroller
18. Circuit board
19. LED2
20. Switch
21. Rechargeable battery
22. Solar cell
23. Solenoid
24. Solenoid plunger
25. Stationary pivot
26. Triangular platform
27. Servomotor 1
28. Servomotor 1 armature
29. Servomotor 2
30. Servomotor 2 armature
31. R4 47 ohm resistor
32. R5 150 ohm resistor
33. R3 150 ohm resistor
34. R6 100K ohm resistor
35. R1 7.5K ohm resistor
36. R2 1M ohm resistor
37. U1 transistor
38. Schottky diode

DETAILED DESCRIPTION

FIG. 1 is a right side perspective view from above the device constructed in accordance with one embodiment. A ground stake 4 is attached to the enclosure 1. Also shown is a detachable flexible rod assembly including wire rod 2 and illuminated tip 3. The device may be placed into the soil of garden, lawn or other area in an upright position. The rod preferably has a black exterior so it is not perceivable in low light.

FIG. 2 shows a bottom perspective view. Located on the bottom side of the device is a MODE button 5 for switching the device into different operational modes. For example, various on and off configurations and firefly activity levels.

FIG. 3 shows the device without the ground stake 4 for alternate placement such as a tabletop, floor or other flat surface.

FIG. 4 shows a close-up view of the detachable flexible rod assembly shown in FIG. 1. Wire rod 2 is flexible and electrically conductive. A ground wire 7 is wrapped around wire rod 2 and both are attached to LED1 6. The opposite end of wire rod 2 and ground wire 7 are attached to a connector 9. The wire rod 2 and the ground wire 7 comprise the two conductors needed for powering LED1 6. In this example, LED1 6 provides light for the illuminated tip 3 of FIG. 1 and the connector 9 allows the user to plug and unplug the rod assembly.

FIG. 5 shows an alternative embodiment. Shown is a cross-section view of a pendulum 10 with encapsulated LED1 6 and detachable clear rod 8 press fit into the pendulum. LED1 6 is connect to a pair of flexible wire 13 and housed within the pendulum 10. Light from LED1 6 is transmitted thru the bottom end of the clear rod 8 to its tip where there appears a point of illumination from LED1 6. The detachable rod 8 may consist of optical fiber(s) well known in the art to create the illuminated tip. The clear rod 8 preferably has a black exterior so it is not perceivable in low light.

Figure 6B:
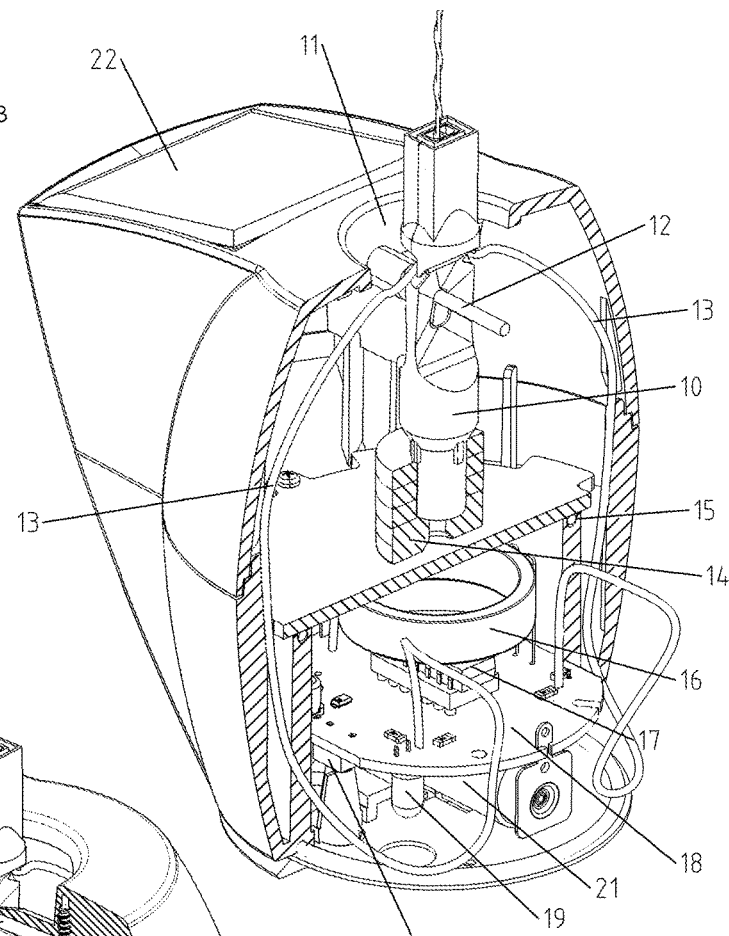
FIG. 6B illustrates a cross-sectional view section thru the mid-rear plane showing internal components of device.
Figure 6A:
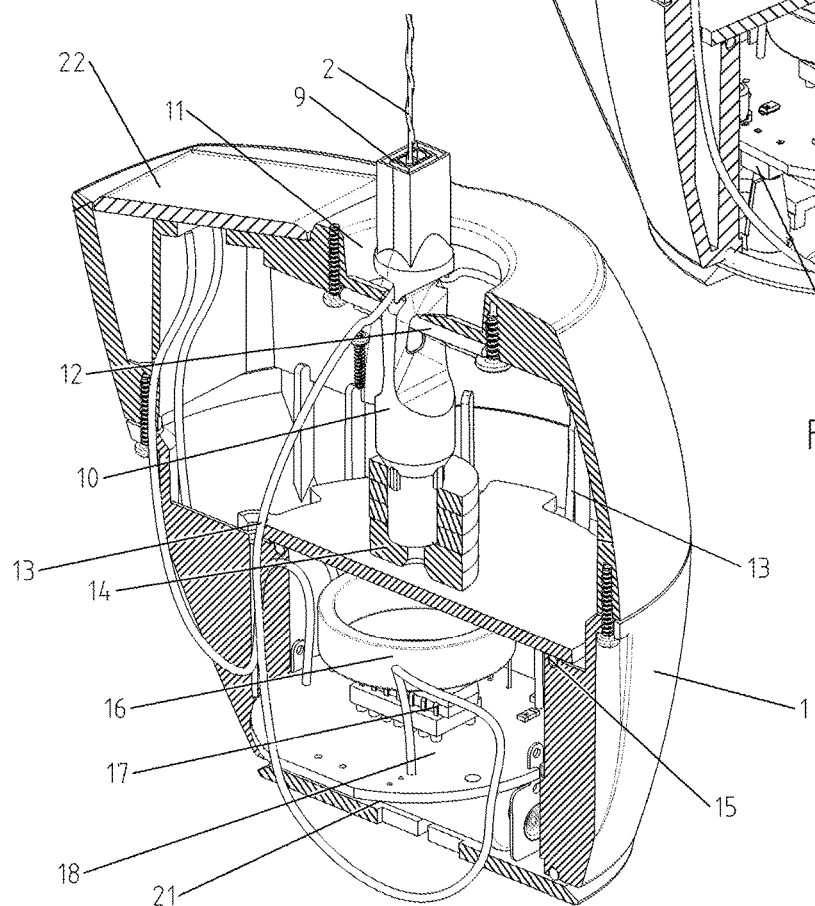

FIG. 6 shows the location of the cross-section for FIG. 6A and FIG. 6B.

FIG. 6A shows a cross-sectional view mid-way thru the right side of the enclosure 1 to reveal internal components. Connector 9 plugs into a receptacle of a free-swinging pendulum 10 that is resting on a stationary pin 12. The body of pendulum 10 includes an elongated hole with a beveled edge which then acts as the fulcrum that rests on the stationary pin 12. As a result the pendulum 10 is free to swing a wide angle.

A magnet 14 is shown fastened to the pendulum with electromagnetic coil 16 positioned below magnet 14. The current of electromagnetic coil 16 is controlled by microcontroller 17. The microcontroller 17, along with other discrete components, are mounted on a circuit board 18. When the electromagnetic coil 16 is not energized, the weight of magnet causes pendulum 10 to center over electromagnetic coil 16 and wire rod 2 is vertical. When current is applied to the electromagnetic coil 16 opposing magnetic fields cause magnet 14 to be deflected away from the center position.

Because the current that energizes the electromagnetic coil 16 is modulated (turned on and off) by the microcontroller 17 at pseudorandom intervals, the wire rod 2 swings in multiple pseudorandom positions within a circular 360-degree upper hemisphere field. Additionally, inertia of the wire rod 2 extends movement and motion even after electromagnetic coil is not energized adding fluidly to the motion of the wire rod 2.

A flexible wire pair 13 is connected to a two-pin connector 9 and routed to the circuit board 18. In addition to controlling the electromagnetic coil 16, the microcontroller 17 also controls the pseudorandom illumination of LED1 6 and synchronizes the timing of its illumination with the energizing of the electromagnetic coil 16, thus resulting in the LED1 6 always being illuminated while in motion.

The pseudorandom motion of wire rod 2 with illumination of LED1 6 create the appearance of a brief point of light appearing in one position and then disappearing in another position as if it were flying. The microcontroller 17 is programmable to simulate the behavioral pattern of real fireflies both in their movement (flight) and their momentary illumination.

An internal rechargeable battery 21 is positioned at the bottom of the housing powering the device. The rechargeable battery 21 is charged in the daylight hours by an integrated solar cell 22.

In FIG. 6B MODE button 5 (not shown) activates switch SW1 20 for setting the different operational modes for the device. A bi-color light emitting diode LED2 19 emits different colors depending on the selected mode as feedback to the user.

This embodiment is constructed in such a way that water can enter from the pendulum opening 11 of the device where the pendulum 10 protrudes. An inner chamber is positioned within the enclosure that is sealed off from water with an O-ring 15. Within this inner chamber is positioned the electromagnetic coil 16, circuit board 18 and rechargeable battery 21.

Figure 7:
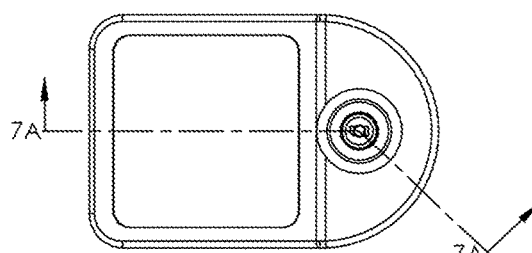
FIG. 7 and FIG. 7A illustrates a perspective right side view cross-sectional view of an alternative rod assembly movement mechanism showing a three-solenoid arrangement.
Figure 7A:
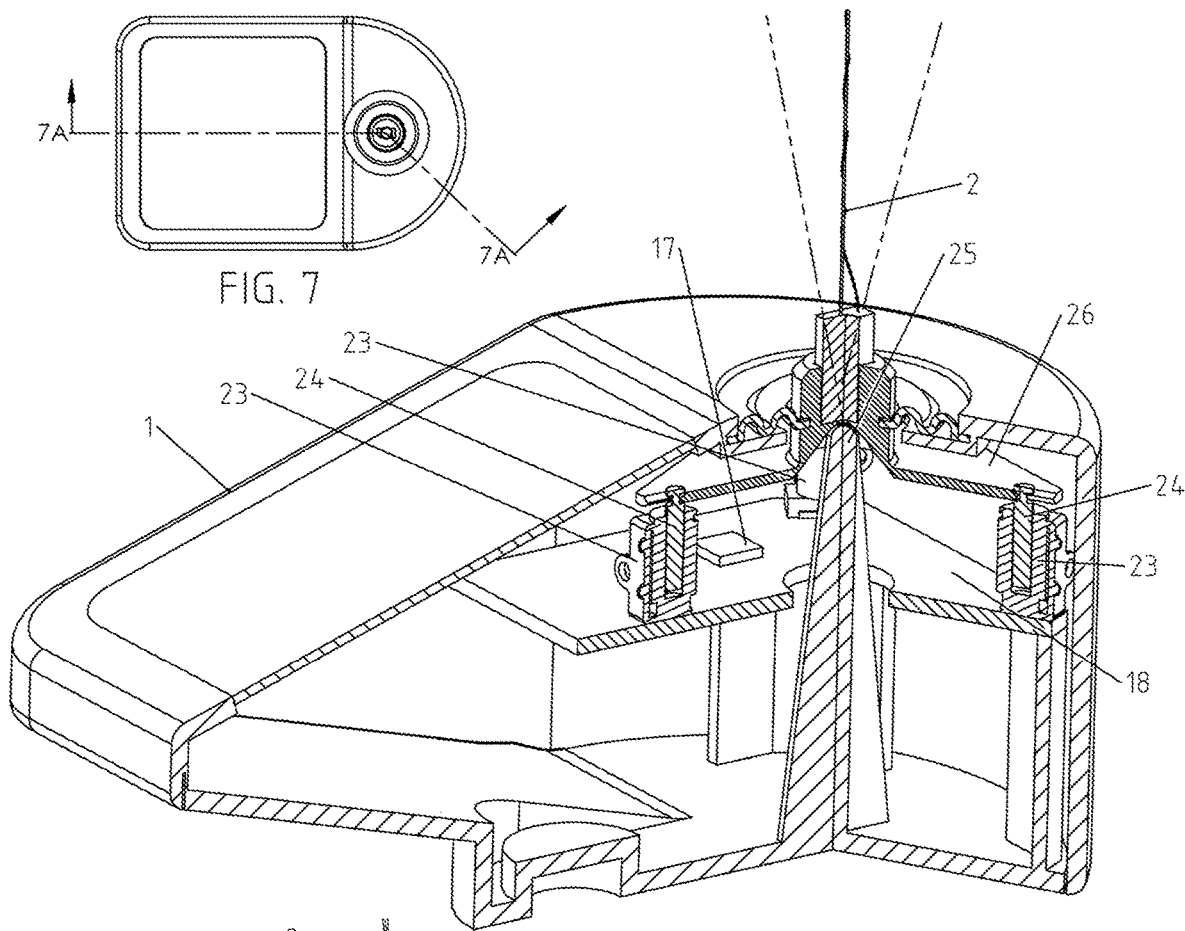

FIG. 7 shows the position of the cross-section of FIG. 7A. FIG. 7A shows an alternative embodiment cross-section thru the enclosure 1 to internal components. FIG. 7A shows three solenoids 23 positioned in a triangular arrangement. The solenoid plunger 24 of each solenoid 23 are attached to one of three corners of a triangular platform 26. The connector 9 and attached wire rod 2 are connected to the center of the triangular platform 26. The triangular platform 26 rests on a stationary pivot 25 integral to the enclosure 1. The three solenoids 23 are affixed to the circuit board 18 which is stationary to the enclosure 1. As one or more solenoids 23 are energized by the microcontroller 17, one or more solenoid plungers 24 tilt the triangular platform 26.

Figure 8:
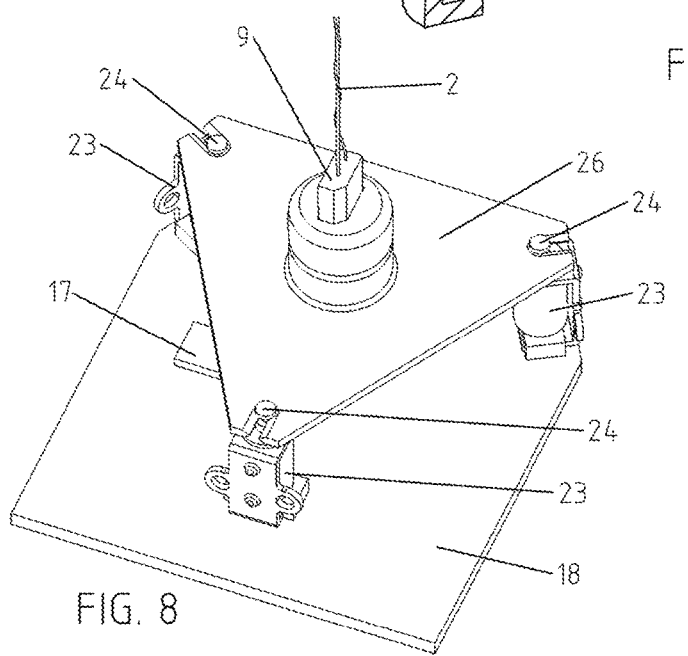
FIG. 8 illustrates a perspective close-up of the three-solenoid arrangement.

FIG. 8 shows the triangular platform 26 which tilts to re-position the rod assembly from vertical resting position to one of several angular positions in a 360-degree upper hemispherical area. The quick activation of the solenoid plunger 24 results in accelerated angular motion in the tilting platform 26 which in turn is transferred to the inertia of the rod assembly giving an extended range of motion.

Figure 9:
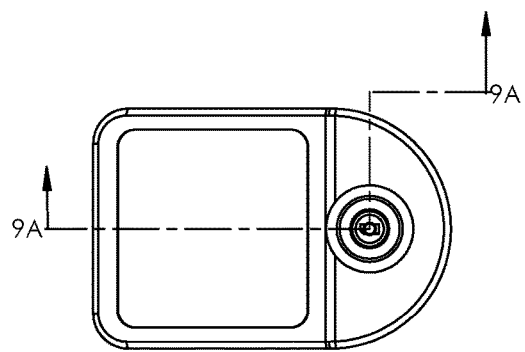
FIG. 9 and FIG. 9A illustrates a perspective right side cross-sectional view of a second alternative rod assembly movement mechanism showing a two servomotor arrangement.
Figure 9A:
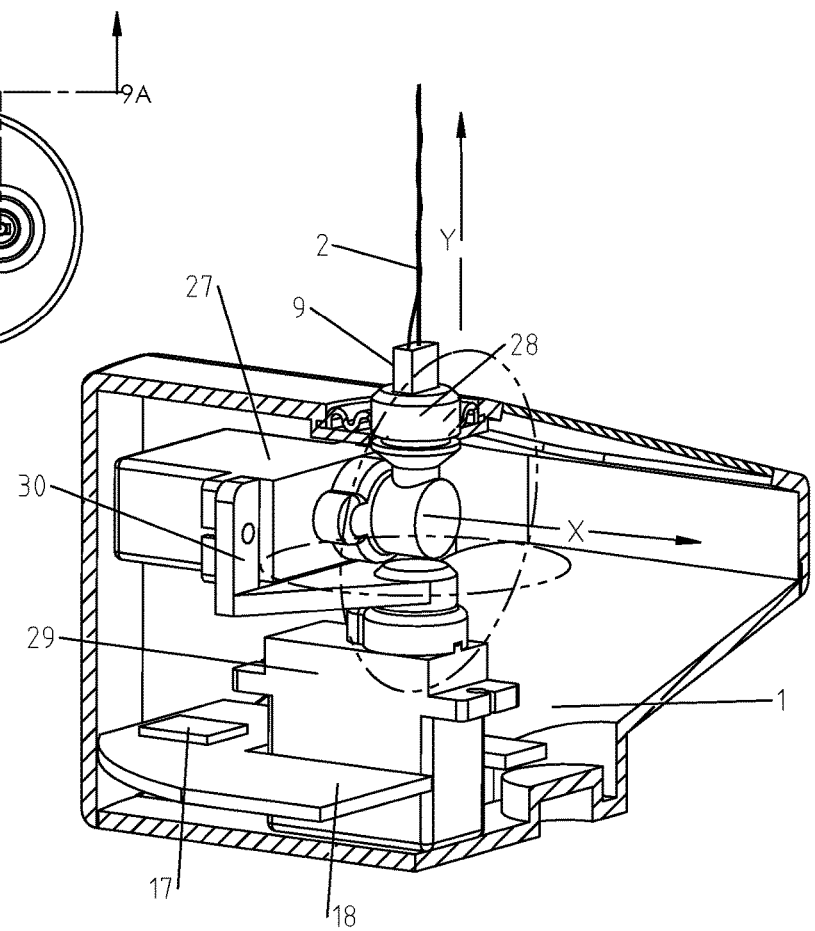
Figure 9D:
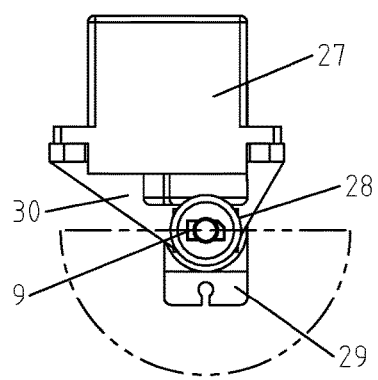
FIGS. 9B, 9C and 9D illustrates front, side and top views respectively of the servomotor arrangement.
Figure 9B:
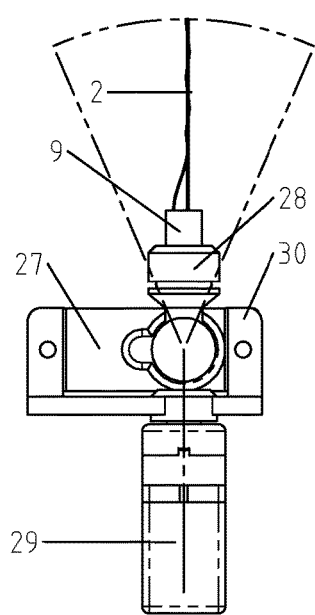
Figure 9C:
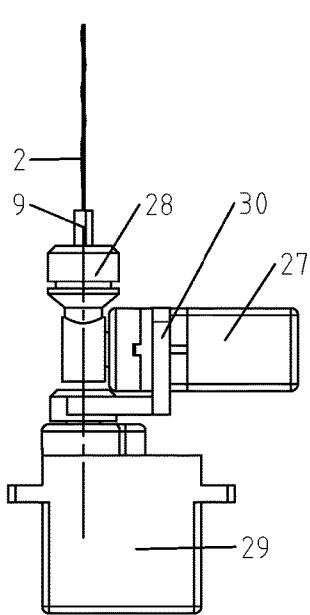

FIG. 9 shows the position of cross-section for FIG. 9A. FIG. 9A shows an alternative embodiment sectioning thru the enclosure to reveal internal components. The rod assembly connector 9 is plugged into the servomotor 1 armature 28. The rotational movement of servomotor 1 27 is shown as around the X axis. The servomotor 1 armature 28 is attached to the rotational movement of servomotor 1 27. The rotational movement of servomotor 2 29 is shown around the Y axis. Servomotor 2 armature 30 is attached to rotational axis of servomotor 2 29. Servomotor 1 27 is mounted to servomotor 2 armature 30. Servomotor 2 29 is mounted to enclosure 1. This enables the rod assembly to be rotated on both the X-axis and Y axis.

Both servomotor 1 27 and servomotor 2 29 are controlled by the microcontroller 17 attached to the circuit board 18. When one or both servomotor 1 27 (X axis) and servomotor 2 29 (Y axis) are energized, each can rotate their axis plus or minus 90 degrees from vertical. As a result the position of the rod assembly tip (where the illuminated tip 3 is located) can be positioned at any three dimensional point in a 360-degree upper hemispherical area. The combination of X axis and Y axis rotation creates potentially millions of pseudorandom flying patterns that vary in both their position and velocity of movement.

Figure 10:
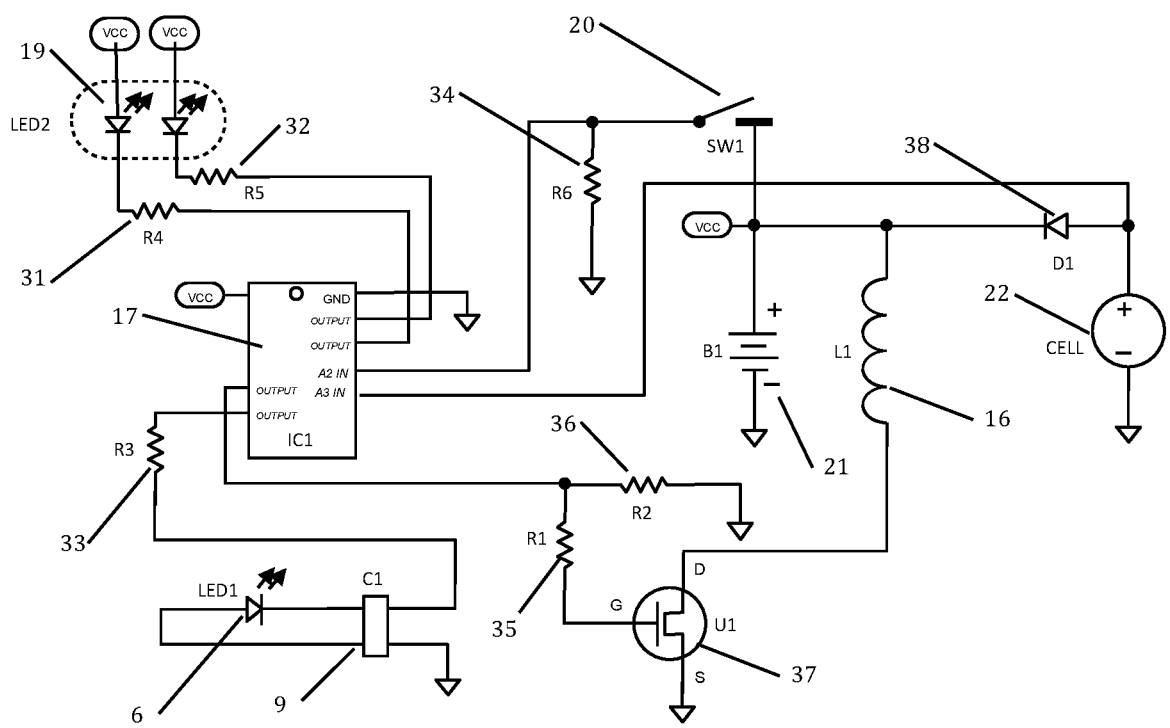
FIG. 10 is a schematic of the electronic circuit controlling the firefly device.

FIG. 10 shows an embodiment of a schematic view of the electronic circuit of the device. The main parts in this schematic are as follows: IC1 17 is a microcontroller, such as an ATTINY44 made by Microchip Corporation; SW1 20 is a switch, such as a TL59AF100Q made by E-Switch corporation; R4 31 is a 47 ohm resistor, such as a RMCF1206JT47R0 made by Stackpole Electronics Inc.; LED2 19 is a bi-color light emitting diode, such as a MV5439A made by Everlight Electronic Co.; R5 32 is a 150 ohm resistor, such as a URMCF1206JT150R made by Stackpole Electronics Inc.; R3 33 is a 150 ohm resistor, such as a URMCF1206JT150R made by Stackpole Electronics Inc.; R6 34 is a 100K ohm resistor, such as a RMCF1206JT100K made by Stackpole Electronics Inc.; LED1 6 is a light emitting diode, such as a TLHE4600 made by Vishay Optoelectronics Division; C19 is a 2-pin connector, such as a SYR-02TV made by JST Sales America Inc.; R1 35 is a 7.5K ohm resistor, such as a RMCF1206JT7K50 made by Stackpole Electronics Inc.; U1 37 is a MOSFET N-channel transistor, such as a DMN63D8L-7 made by Diodes Incorporated; R2 36 is a 1M ohm resistor, such as a RMCF1206JT1M00 made by Stackpole Electronics Inc.; L1 16 is a 20 ohm air coil, such as made by Dongguan Kim Chen Inc.; B1 21 is a 3.2V lithium battery, such as a B01NAAKLWC made by Exell; CELL 22 is a solar cell, such as a 5M4545 made by Ningbo Sunboy New Energy Corporation; D1 38 is a Schottky diode, such as a SD0805S020S0R5 made by AVX Corporation.

Again referring to FIG. 10 a momentary press of SW1 20 instructs the microcontroller 17 to put the device into various operational states. When SW1 20 is depressed, the microcontroller 17 energizes LED2 19 as a feedback indicator using different colors and flashing to inform the current mode state of the device.

R3 33, R4 31 and R5 32 are current limiting resistors for LED1 6 and LED2 19 respectively. IC1 17 takes input from SW1 20 and outputs a response to LED2 19 thereby giving feedback to the user. IC1 17 sends a momentary PWM (pulse width modulated) voltage to LED1 6 to control its fade up and down rate as well as duration of full brightness. C1 9 connector is connected to LED1 6 described in FIG. 4 above. When using alternative embodiment described in FIG. 5, connector C1 is eliminated. A PWM or digital pulse outputs to R1 35 resistor. R1 35 and R2 36 comprise a voltage divider for the gate of U1 37, a MOSFET N-Channel transistor. The source of U1 37 is connected to ground while the drain of U1 37 energizes current in L1 16.

The rechargeable battery 21 is charged in the daylight hours by means of CELL 22, a solar cell. D1 38 a Schottky diode limits any reverse voltage from VCC getting back to CELL 22 which would prematurely drain the rechargeable battery 21. Finally, CELL 22 is connected to an input pin on the IC1 17 in which microcontroller monitors the voltage of the CELL 22 to determine whether it is dark or light (night time or daytime).

Figure 11:
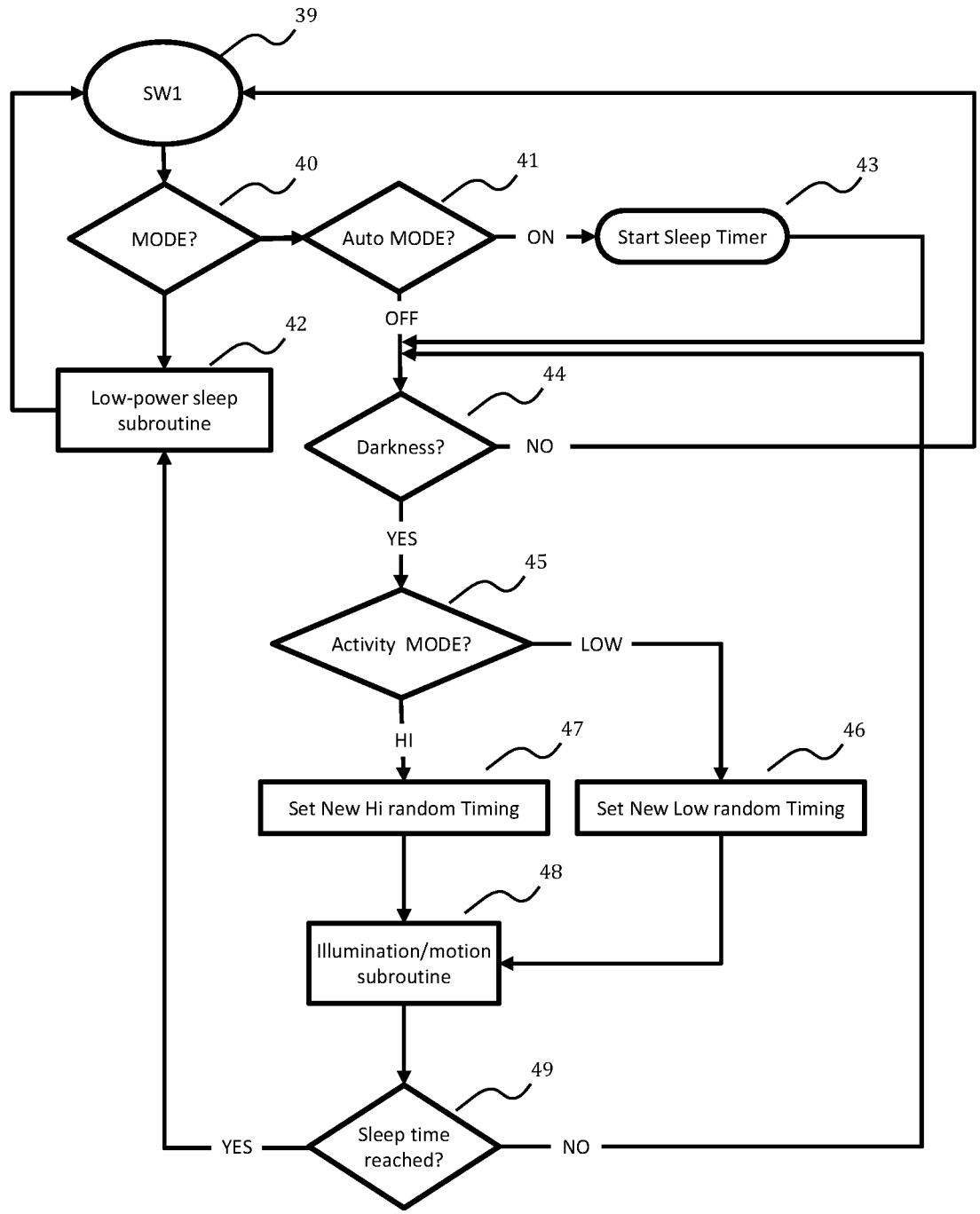
FIG. 11 is a flow diagram for the program operation of the device.

Referring to FIG. 11, there is shown a main flow diagram of a program. When SW1, block 39, is momentarily depressed it sets the device into one of several operational states or modes. Block 40 determines the current mode. If the current mode is sleep, block 42 puts the microcontroller 17 into a Low-power sleep subroutine (refer to FIG. 13 for Low-power sleep subroutine). If block 40 determines that the current mode is other than sleep or OFF, the program proceeds to block 41 which checks whether the Auto MODE has been set by SW1, block 39. If the Auto MODE has been set to ON then block 43 initiates the start of a countdown timer for the predetermined amount of milliseconds (typically 4 hours) that are elapsed before the program goes to sleep. Block 44 checks for darkness by means of the solar cell 22 and its voltage input to the microcontroller 17. If it is not dark block 44 directs the program to loop back to check any change in block 39.

If it is dark as determined by block 44, the program then proceeds to block 45 to determine if the period of the illuminated tip and motor mechanism is set to HI activity or LOW activity. Hi activity means that the illumination of LED1 6 will pseudorandomly appear more often and LOW activity means less often. If block 45 is set to HI it directs the program to block 47 which assigns a new pseudorandom generated value within a limited range for the next time the program loops that results in a more frequently appearing LED1 6. If the Activity MODE 45 is set to LOW block 46 assigns a new pseudorandom generated value within a limited range for the next time the program loops, that results in a less frequently appearing LED1 6. Block 48 runs the subroutine for the illumination and motion of the device (refer to FIG. 12 for Illumination/motion subroutine). "Block 49 checks whether the sleep time has been reached and if not loops back to block 44 darkness check. If sleep time has been reached (countdown timer expired), block 49 loops back to block 42 low-power sleep routine."

Figure 12:
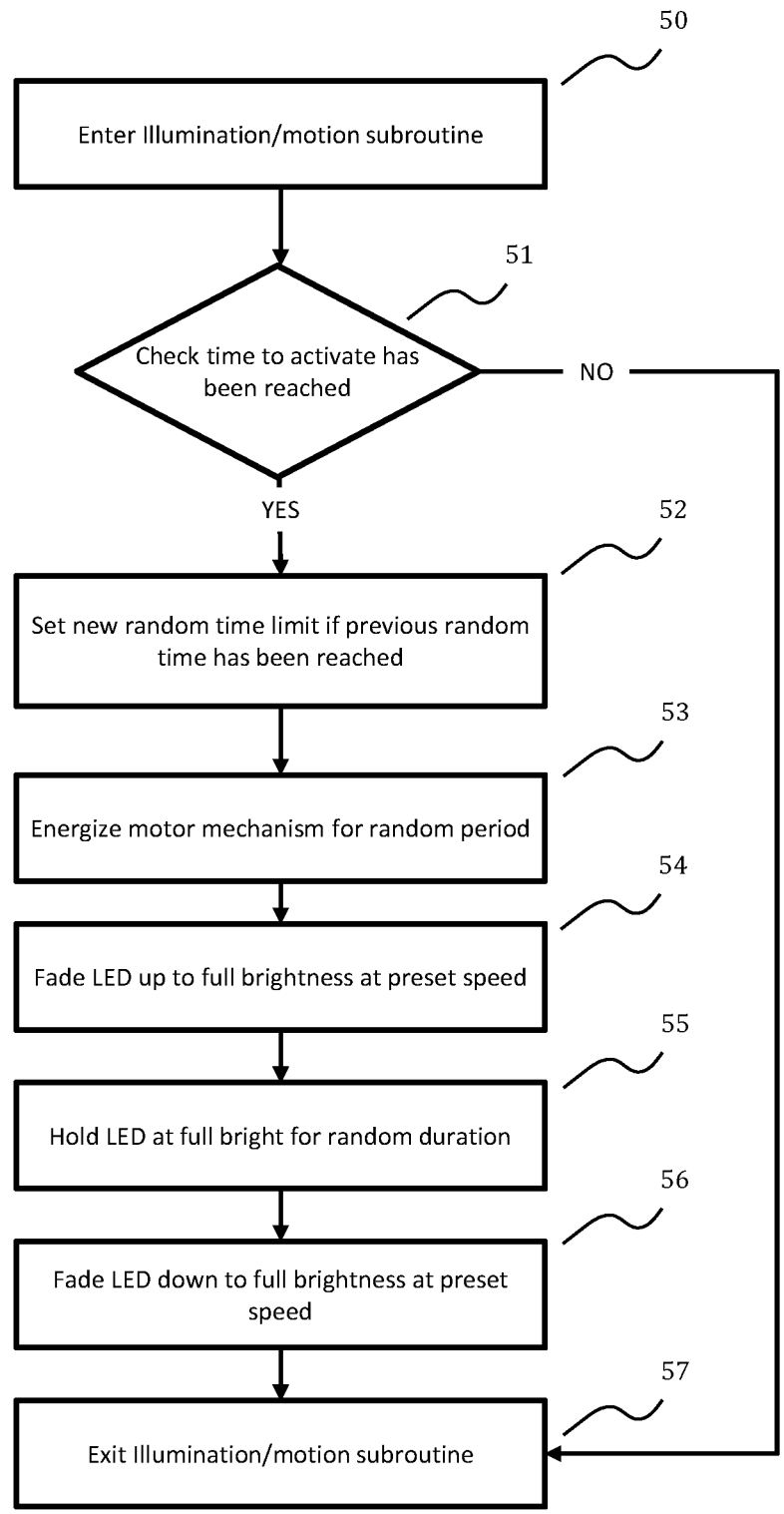
FIG. 12 is a flow diagram of the Illumination/motion subroutine.

FIG. 12 there is shown a flow diagram of the Illumination/motion subroutine. Upon entering block 50, block 51 checks if the limit has been reached for motion activation time. If the limit has not been reached, the program is instructed to proceed to block 57 and exit the subroutine. If the limit has been reached, the program proceeds to block 52 which resets the motion activation time to a new pseudorandom value for the next time the motion subroutine is entered. Block 53 energizes the electromagnetic coil 16 for a pseudorandom-number-generated duration. Block 54 fades the LED1 6 up to full brightness at a predetermined speed. Block 55 holds the LED1 6 at full brightness for a pseudorandom-number-generated duration. Block 56 fades the LED1 6 down to zero brightness at a predetermined speed. Block 57 exits the subroutine and back to the main program.

Figure 13:
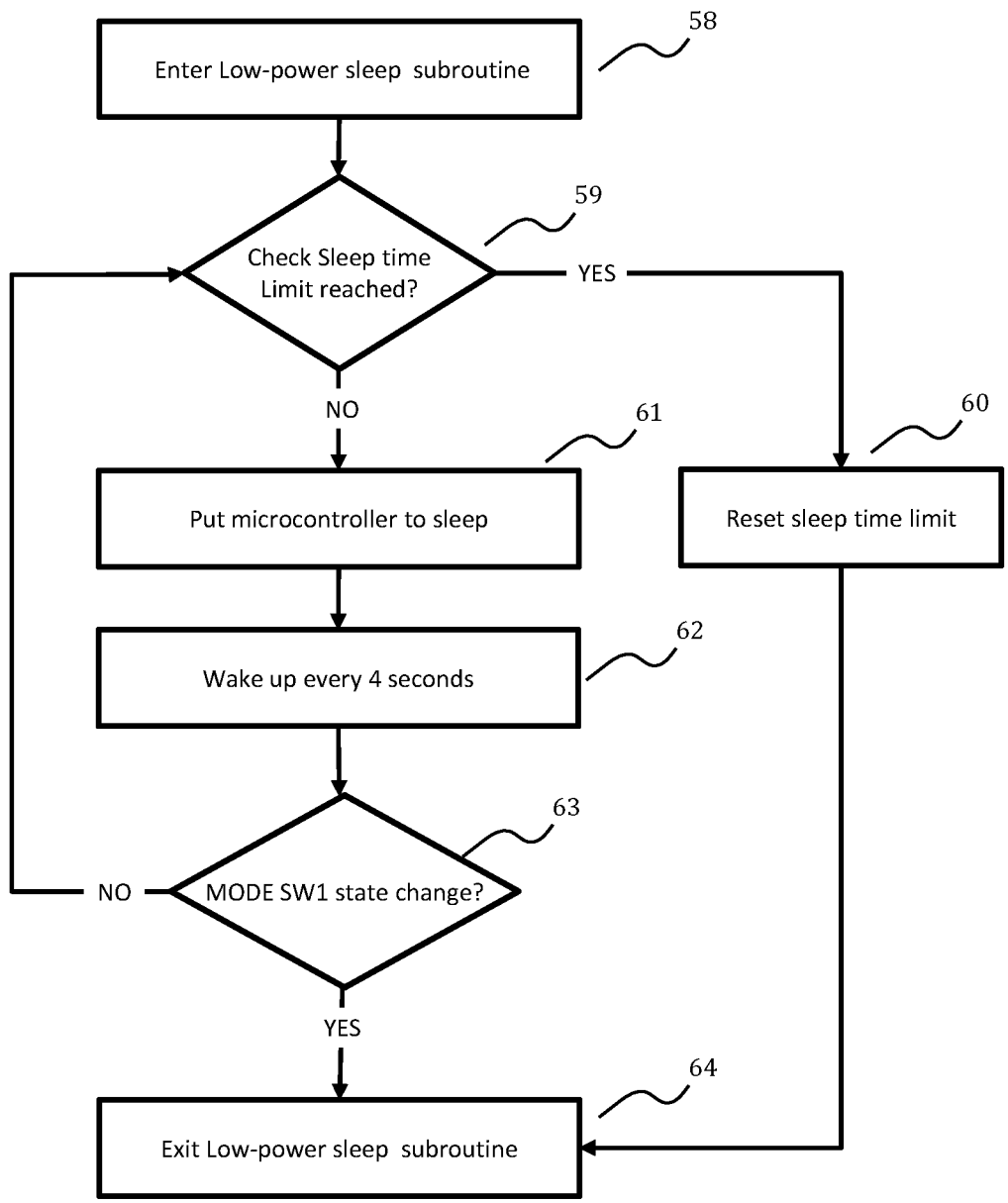
FIG. 13 is a flow diagram of the Low-power sleep subroutine.

FIG. 13 there is shown a flow diagram of the low-power sleep subroutine. Upon entering block 58, block 59 checks whether the predetermined sleep time limit has been reached. If yes, then block 60 resets the sleep time limit and then proceeds to block 64 which exits the subroutine. If no, block 61 puts the microcontroller 17 into a low power sleep state. Block 62 is a watch-dog timer which wakes the microcontroller 17 for a brief period every four seconds to check whether there has been a change in the state of block 40 (shown in FIG. 11). If there has been no change, block 63 proceeds back to block 59. If block 63 senses a change of block 39 SW1 from sleep to another mode, then block 63 proceeds to block 64 which exits the subroutine.

Example Operation

When the surrounding ambient light becomes dark, the device turns itself on automatically. In pseudorandom intervals between two seconds and twenty seconds, the illuminated tip 3 will light and fade to full brightness and hold full brightness for a pseudorandom number of milliseconds while moving thru the air in a pseudorandom trajectory and velocity and then its brightness will fade to zero brightness. The pseudorandom appearance of the illumination tip 3, pseudorandom motion and velocity occur throughout an approximate four hour period and then the device shuts itself off (when set to Auto MODE). If the user wishes to extend the four hour period they can depress the MODE button 5 to the ON position and the device will operate whenever darkness exists. The next day, when there is daylight, the integrated solar cell 22 will charge the rechargeable battery 21 while there is daylight and will be ready to operate again upon the next period of darkness.

As will be apparent to those skilled in the art, there are other circuits and structures beyond and/or in addition to those explicitly described herein which will serve to implement the mechanism of the present invention. Although the above description enables the embodiments described herein, these specifics are not intended to restrict the invention, which should only be limited as defined by the following claims.

What is claimed is:

1. A device comprising:
   a rod with a tip extending from an enclosure;
   a stationary pin in said enclosure
   a pendulum comprising a fulcrum resting on said stationary pin;
   a magnet attached to said pendulum;
   an electromagnetic coil to produce said motion; and
   a microcontroller enabled to control said electromagnetic coil and illumination of said tip.

2. The device of claim 1, wherein said electromagnetic coil is positioned such that when energized, said magnet is deflected.

3. The device of claim 1, wherein said microcontroller is enabled to control current of said electromagnetic coil.

4. A device comprising:
   a rod with a tip extending from an enclosure;
   a stationary pivot contained in said enclosure;
   a tilting platform coupled to said rod resting on said stationary pivot an assembly of three solenoids with solenoid plungers, said plungers mounted to said tilting platform adapted to produce motion of said rod; and
   a microcontroller enabled to control said solenoids and illumination of said tip.

5. The device of claim 4, wherein each said solenoid plunger is positioned substantially 120 degrees apart from each other.

6. A device of claim 1, comprising:
   a first servomotor connected to a first armature;
   a rod with a tip extending from an enclosure, said rod connected to said first armature;
   a second servomotor connected to a second armature, said second armature connected to said first servomotor, said first armature and said second armature adapted to produce motion of said rod; and
   a microcontroller enabled to control said first servomotor, said second servomotor, and illumination of said tip.

7. The device of claim 4, wherein said microcontroller is enabled to control current of said solenoids.

8. The device of claim 6, wherein said microcontroller is enabled to control current of said servomotors.

9. The device of claim 3, claim 7 or claim 8, wherein said microcontroller is enabled to synchronize timing of said illumination and said current.

10. The device of claim 1, claim 4, or claim 6 wherein said microcontroller enables pseudorandom in-flight control within a 360 degree upper hemispherical area for said tip.

11. The device of claim 1, claim 4, or claim 6 wherein said enclosure includes a switch connected to said microcontroller adapted to set different operational modes device operations.

* * * * *